US012714254B2

(12) United States Patent
Williams et al.

(10) Patent No.: US 12,714,254 B2
(45) Date of Patent: Aug. 25, 2026

(54) SOUS VIDE ASSEMBLY FOR USE IN A MICROWAVE OVEN

(71) Applicant: Haier US Appliance Solutions, Inc., Wilmington, DE (US)

(72) Inventors: Daryl C. Williams, Louisville, KY (US); Mark Heimerdinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 276 days.

(21) Appl. No.: 18/354,240

(22) Filed: Jul. 18, 2023

(65) Prior Publication Data

US 2025/0024980 A1 Jan. 23, 2025

(51) Int. Cl.

| | |
|---|---|
| ***A47J 27/10*** | (2006.01) |
| ***A47J 27/00*** | (2006.01) |
| ***A47J 36/32*** | (2006.01) |
| ***H05B 6/64*** | (2006.01) |

(52) U.S. Cl.

CPC ............. *A47J 27/10* (2013.01); *A47J 27/004* (2013.01); *A47J 36/32* (2013.01); *H05B 6/6408* (2013.01)

(58) Field of Classification Search

CPC .......... A47J 27/004; A47J 27/10; A47J 36/32; H05B 6/6408

USPC ....... 219/688, 681, 682, 679, 687, 401, 712, 219/729, 732, 734, 738, 730, 745, 746, 219/756; 426/241, 243, 107, 412, 415, 426/232

See application file for complete search history.

(56) References Cited

U.S. PATENT DOCUMENTS

| | | | |
|---|---|---|---|
| 9,220,362 | B2 | 12/2015 | Eades et al. |
| 10,721,948 | B1 | 7/2020 | Swayne |
| 10,827,872 | B2 | 11/2020 | Trice |
| 10,863,589 | B2 | 12/2020 | Lee |

(Continued)

FOREIGN PATENT DOCUMENTS

| | | | |
|---|---|---|---|
| CA | 2865211 | A1 | 3/2016 |
| CN | 1779362 | A | 5/2006 |

(Continued)

OTHER PUBLICATIONS

Everie Versatile 12-Quart Sous Vide Container with Built-in Rack and Collapsible Silicone Lid and Container Sleeve Compatible with All Sous Vide Cookers, KIT-1202-TYGJ, accessed https://www.amazon.ca/EVERIE-Versatile-Collapsible-Compatible-KIT-1202-TYGJ/dp/B0BKFN9PSH?th=1 on Mar. 19, 2024, 7 pages.

*Primary Examiner* — Quang T Van

(74) *Attorney, Agent, or Firm* — Dority & Manning, P.A.

(57) ABSTRACT

A microwave oven includes a cooking chamber, a microwave heating assembly for generating microwave energy within the cooking chamber, and a sous vide assembly configured for receipt within the cooking chamber for cooking one or more food items, the sous vide assembly including an outer tank configured for containing a volume of water. A controller determines first stage sous vide parameters (including a first stage time) and second stage sous vide parameters based at least in part on an initial water temperature and a target doneness level, operates the microwave heating assembly using the first stage sous vide parameters, and operates the microwave heating assembly using the second stage sous vide parameters when the first stage time has elapsed.

13 Claims, 6 Drawing Sheets

(56) References Cited

U.S. PATENT DOCUMENTS

| | | | | |
|---|---|---|---|---|
| 11,022,321 | B1 | 6/2021 | Bhogal et al. | |
| 11,659,634 | B2 * | 5/2023 | Staun ..................... | H05B 6/645 219/679 |
| 2018/0049579 | A1 | 2/2018 | Puchinger et al. | |
| 2019/0110630 | A1 | 4/2019 | Kitabayashi | |
| 2020/0281049 | A1 | 9/2020 | Staun | |
| 2020/0367692 | A1 | 11/2020 | Stipe | |
| 2020/0397177 | A1 | 12/2020 | Walsh | |
| 2021/0038013 | A1 | 2/2021 | Trice et al. | |
| 2022/0257043 | A1 | 8/2022 | Baldwin et al. | |
| 2023/0232507 | A1 | 7/2023 | Heimerdinger | |
| 2023/0247736 | A1 | 8/2023 | Staun et al. | |

FOREIGN PATENT DOCUMENTS

| | | | | |
|---|---|---|---|---|
| CN | 105823098 | B | 2/2018 | |
| EP | 3686495 | B1 * | 4/2024 | .............. F24C 7/085 |
| JP | 2005077021 | A | 3/2005 | |
| KR | 101728660 | B1 | 4/2017 | |
| KR | 20230117985 | A | 8/2023 | |
| WO | WO2020173027 | A1 | 9/2020 | |
| WO | WO2020253812 | A1 | 12/2020 | |

* cited by examiner

SURFACE WATER TEMP
TEMPERATURE
AVERAGE WATER TEMP
100% POWER
LESS THAN 100% POWER
TIME

STAGE 1
EXAMPLE OF LABORATORY SOUS VIDE LOG
SURFACE WATER TEMP (F)
STAGE 2
STAGE 3
% POWER LEVEL
IR SURFACE TEMP
POWER LEVEL
MINUTES

SOUS VIDE ASSEMBLY FOR USE IN A MICROWAVE OVEN

FIELD OF THE INVENTION

The present subject matter relates generally to microwave oven appliances, and more particularly to systems and methods for implementing sous vide cooking in microwave oven appliances.

BACKGROUND OF THE INVENTION

Microwave oven appliances generally include a cabinet that defines a cooking chamber for receipt of food items for cooking. These appliances typically include one or more heating elements for generating energy to heat the food items during a cooking process. For example, microwave ovens typically include at least one source of electromagnetic radiation in the microwave frequency range, such as a cavity magnetron. In order to provide selective access to the cooking chamber and to contain food particles and cooking energy (e.g., microwaves) during a cooking operation, microwave appliances further include a door that is typically pivotally mounted to the cabinet.

Sous vide is a method of cooking that requires the application of low levels of heat (e.g., 130 to 160 degrees Fahrenheit) over the course of several hours (e.g., one or more hours, such as two or more hours, such as three or more hours, etc.). Even small temperature variations over the duration of the cooking operation can result in drastically different cooking outcomes. In sous vide, food is often cooked by sealing the food a liquid-proof bag and submerging the bag in liquid that is maintained at the desired temperature. However, conventional sous vide assemblies and cooking methods for use in a microwave permit direct exposure of the food to microwave energy, which may quickly result in overcooking or uneven heating. Alternatively, conventional sous vide assemblies may heat the cooking liquid inefficiently, resulting in extended cooking times.

Accordingly, a microwave oven and sous vide assembly that facilitates improved sous vide cooking would be desirable. More specifically, a sous vide assembly that may be used in a microwave and an associated method to facilitate an efficient, even sous vide cooking process while preventing exposure of food to undesirable levels of microwave energy would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a microwave oven appliance defining a vertical, a lateral, and a transverse direction is provided. The microwave oven appliance includes a cabinet defining a cooking chamber, a door rotatably mounted to the cabinet for providing selective access to the cooking chamber, a microwave heating assembly for generating microwave energy within the cooking chamber, a sous vide assembly configured for receipt within the cooking chamber for cooking one or more food items, the sous vide assembly comprising an outer tank configured for containing a volume of water, and a controller in operative communication with the microwave heating assembly. The controller is configured to obtain an initial water temperature of the volume of water and a target doneness level of the one or more food items, determine first stage sous vide parameters and second stage sous vide parameters based at least in part on the initial water temperature and the target doneness level, the first stage sous vide parameters comprising a first stage time, operate the microwave heating assembly using the first stage sous vide parameters, and operate the microwave heating assembly using the second stage sous vide parameters when the first stage time has elapsed.

In another exemplary embodiment, a method of operating a microwave oven appliance is provided. The microwave oven appliance includes a cooking chamber, a microwave heating assembly for generating microwave energy within the cooking chamber, and a sous vide assembly configured for receipt within the cooking chamber for cooking one or more food items, the sous vide assembly comprising an outer tank configured for containing a volume of water. The method includes obtaining an initial water temperature of the volume of water and a target doneness level of the one or more food items, determining first stage sous vide parameters and second stage sous vide parameters based at least in part on the initial water temperature and the target doneness level, the first stage sous vide parameters comprising a first stage time, operating the microwave heating assembly using the first stage sous vide parameters, and operating the microwave heating assembly using the second stage sous vide parameters when the first stage time has elapsed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
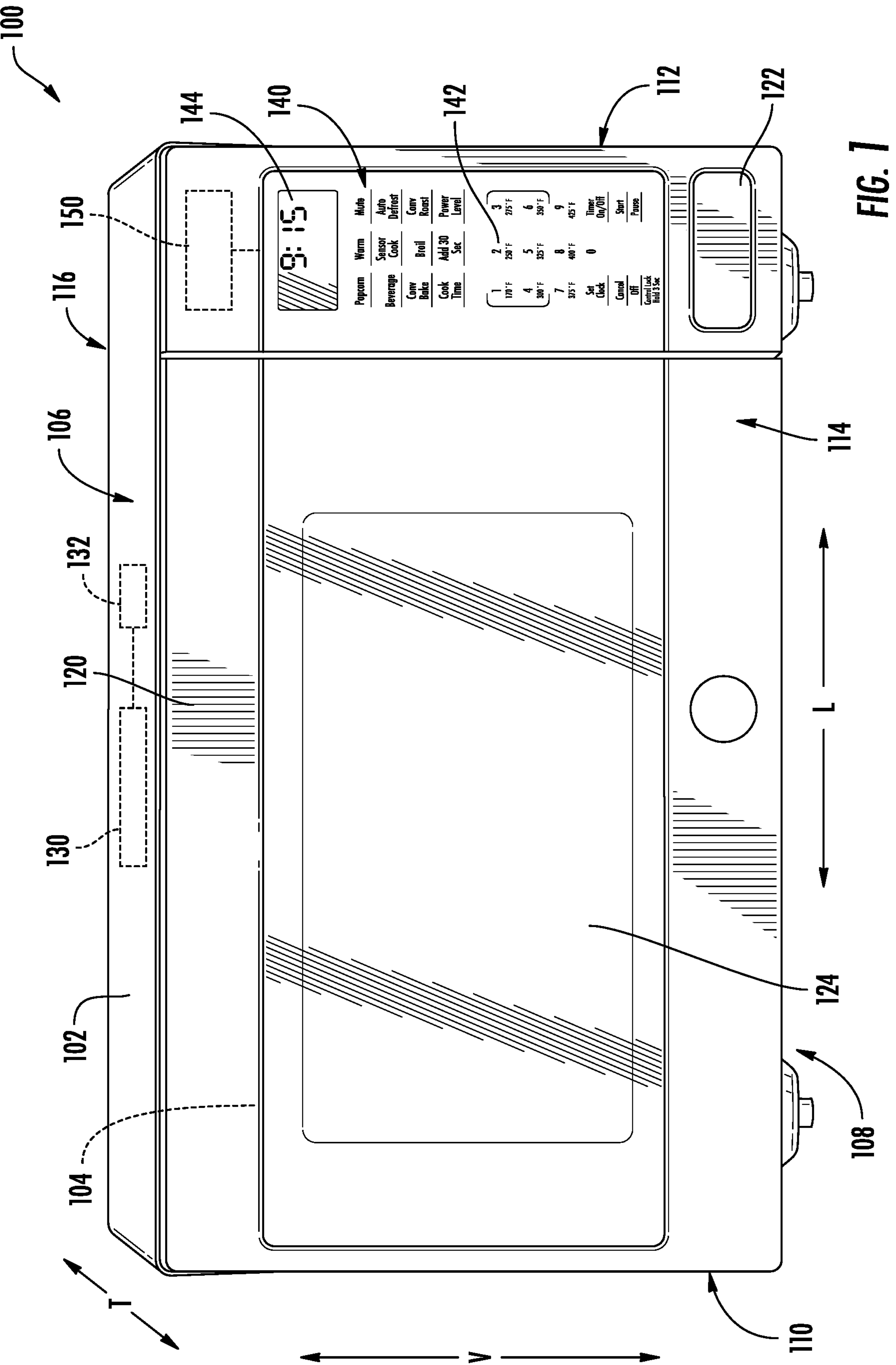
FIG. 1 provides a perspective front view of a microwave oven appliance in accordance with an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
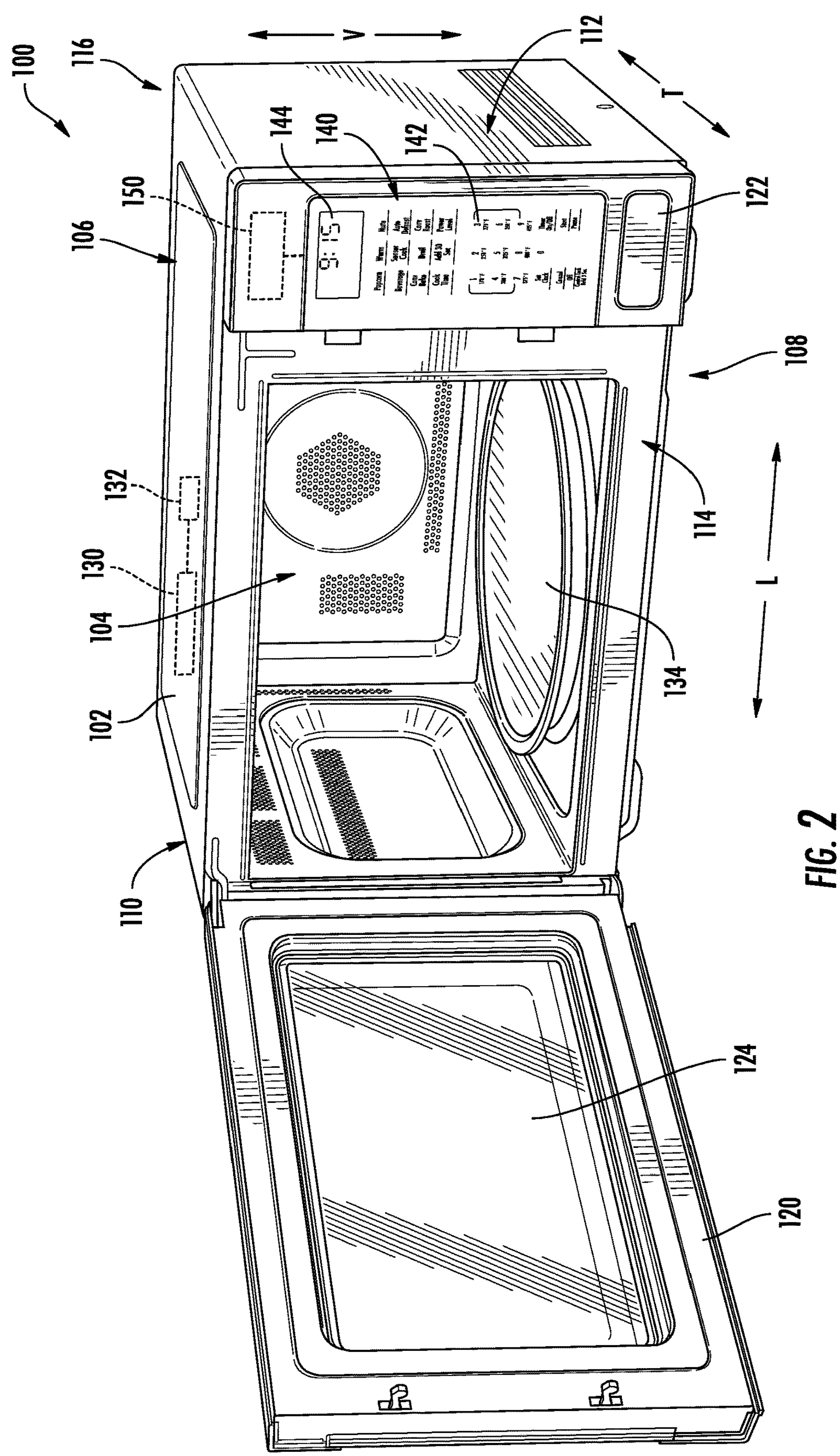
FIG. 2 provides a perspective view of the exemplary microwave oven of FIG. 1 with the door in an open position according to exemplary embodiments of the present disclosure.

Referring now to the figures, FIG. 1 provides a front view of a microwave oven 100 as may be employed with the present subject matter and FIG. 2 provides a perspective view of microwave oven 100 with the door in the open position. Microwave oven 100 includes a cabinet 102 that defines a cooking chamber 104 for receipt of food items for cooking. As will be understood by those skilled in the art, microwave oven 100 is provided by way of example only, and the present subject matter may be used in any suitable microwave oven, such as a countertop microwave oven, an over-the-range microwave oven, etc. Thus, the example embodiment shown in the figures is not intended to limit the present subject matter to any particular cooking chamber configuration or arrangement.

As illustrated, microwave oven 100 generally defines a vertical direction V, a lateral direction L, and a transverse direction T, each of which is mutually perpendicular, such that an orthogonal coordinate system is generally defined. Cabinet 102 of microwave oven 100 extends between a top 106 and a bottom 108 along the vertical direction V, between a first side 110 (left side when viewed from front) and a second side 112 (right side when viewed from front) along the lateral direction L, and between a front 114 and a rear 116 along the transverse direction T.

Microwave oven 100 includes a door 120 that is rotatably attached to cabinet 102 in order to permit selective access to cooking chamber 104. A handle may be mounted to door 120 to assist a user with opening and closing door 120 in order to access cooking chamber 104. As an example, a user can pull on the handle mounted to door 120 to open or close door 120 and access cooking chamber 104. Alternatively, microwave oven 100 may include a door release button 122 that disengages or otherwise pushes open door 120 when depressed. Glass windowpanes 124 provide for viewing the contents of cooking chamber 104 when door 120 is closed and also assist with insulating cooking chamber 104. For example, windowpanes 124 may be constructed from numerous layers, such as a perforated screen, a clear film over the screen to allow splatter to be easily wiped away, and an outer window constructed of glass or clear plastic.

Microwave oven 100 is generally configured to heat articles, e.g., food or beverages, within cooking chamber 104 using electromagnetic radiation. Microwave appliance 100 may include various components which operate to produce the electromagnetic radiation, as is generally understood. For example, microwave appliance 100 may include a microwave heating assembly 130 which may include a magnetron (such as, for example, a cavity magnetron), a high voltage transformer, a high voltage capacitor and a high voltage diode.

According to exemplary embodiments, microwave oven 100 may further include a power supply 132 that is operably coupled to microwave heating assembly 130 to provide energy from a suitable energy source (such as an electrical outlet) to microwave heating assembly 130, e.g., the magnetron. The magnetron may convert the energy to electromagnetic radiation, specifically microwave radiation. Microwave heating assembly 130 and/or power supply 132 may include other suitable components, such as a capacitor that generally connects the magnetron and power supply, such as via high voltage diode, to a chassis. Microwave radiation produced by the magnetron may also be transmitted through a waveguide to cooking chamber 104.

As would be appreciated by one having ordinary skill in the art, power supply 132 may be an inverter power supply that allows the magnetron's analog electric field intensity to be adjusted between various power levels, such as between 10% and 100% of the total power capacity. By contrast, with conventional non-inverter power supplies, the electric field intensity is either 100% or 0%, and power levels are made using a timed duty cycle. For example, a non-inverter power supply set for a 50% power level would turn the magnetron ON at 100% output power for 15 seconds, and then OFF for 15 seconds. At power levels less than 100%, an inverter power supply may provide better heating uniformity and less penetration depth-ideal heating for sous vide as the inverter power supply heats the water while avoiding direct heating of the food with microwave energy.

The structure and intended function of microwave ovens are generally understood by those of ordinary skill in the art and are not described in further detail herein. According to alternative embodiments, microwave oven may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

Microwave oven 100 may include additional features to improve heating uniformity and precision. For example, according to an exemplary embodiment, microwave oven 100 includes a turntable 134 rotatably mounted within cooking chamber 104. Turntable 134 may be selectively rotated during a cooking process to ensure improved temperature uniformity for the object being heated.

Referring again to FIG. 1, a user interface panel 140 and a user input device 142 may be positioned on an exterior of the cabinet 102. The user interface panel 140 may represent a general purpose Input/Output ("GPIO") device or functional block. In some embodiments, the user interface panel 140 may include or be in operative communication with user input device 142, such as one or more of a variety of digital, analog, electrical, mechanical or electro-mechanical input devices including rotary dials, control knobs, push buttons, and touch pads. The user input device 142 is generally positioned proximate to the user interface panel 140, and in some embodiments, the user input device 142 may be positioned on the user interface panel 140. The user interface panel 140 may include a display component 144, such as a digital or analog display device designed to provide operational feedback to a user.

Generally, microwave oven 100 may include a controller 150 in operative communication with the user input device 142. The user interface panel 140 of the microwave oven 100 may be in communication with the controller 150 via, for example, one or more signal lines or shared communication busses, and signals generated in controller 150 operate microwave oven 100 in response to user input via the user input devices 142. Input/Output ("I/O") signals may be routed between controller 150 and various operational components of microwave oven 100. Operation of microwave oven 100 can be regulated by the controller 150 that is operatively coupled to the user interface panel 140.

Controller 150 is a "processing device" or "controller" and may be embodied as described herein. Controller 150 may include a memory and one or more microprocessors, microcontrollers, application-specific integrated circuits (ASICS), CPUs or the like, such as general or special purpose microprocessors operable to execute programming instructions or micro-control code associated with operation of microwave oven 100, and controller 150 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Aspects of the present subject matter are generally directed to systems and methods for implementing a sous vide cooking process in a microwave oven, such as microwave oven 100. More particularly, according to exemplary embodiments of the present subject matter, cooking chamber 104 is configured for receipt of a sous vide assembly 200 (e.g., on turntable 134) for facilitating a sous vide cooking process within microwave oven 100. According to exemplary embodiments, turntable 134 is rotated during the sous vide process for improved thermal uniformity. As would be appreciated by one having ordinary skill in the art, a sous vide cooking process is a type of cooking where a food item (such as meat) is vacuum sealed in a bag and submerged in a bath of water maintained at a desired temperature until the meat reaches the desired internal temperature. Notably, precise temperature control is very desirable for sous vide cooking processes.

Figure 3:
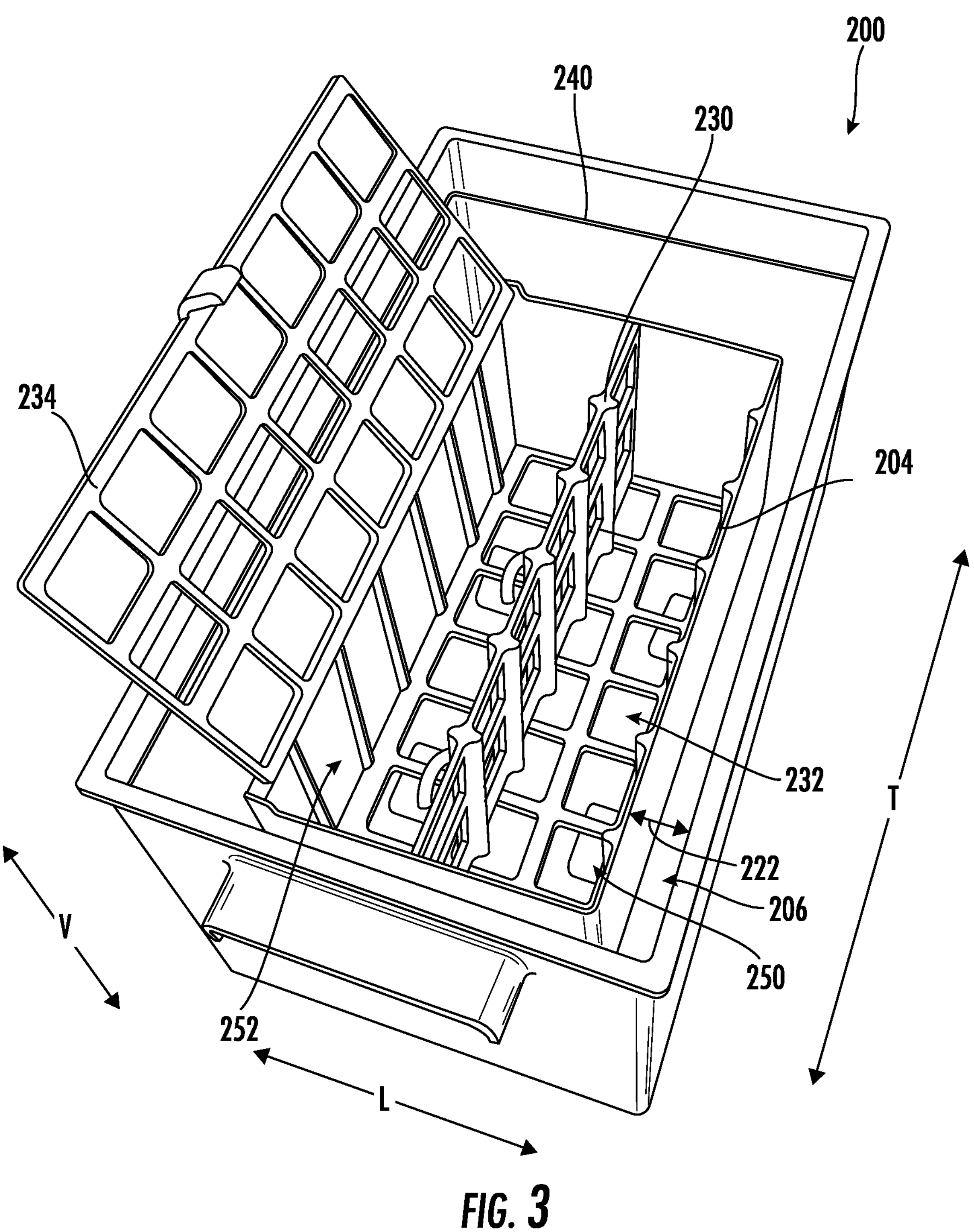
FIG. 3 provides a perspective view of a sous vide assembly that may be used in the exemplary microwave oven of FIG. 1 according to an exemplary embodiment of the present subject matter.
Figure 4:
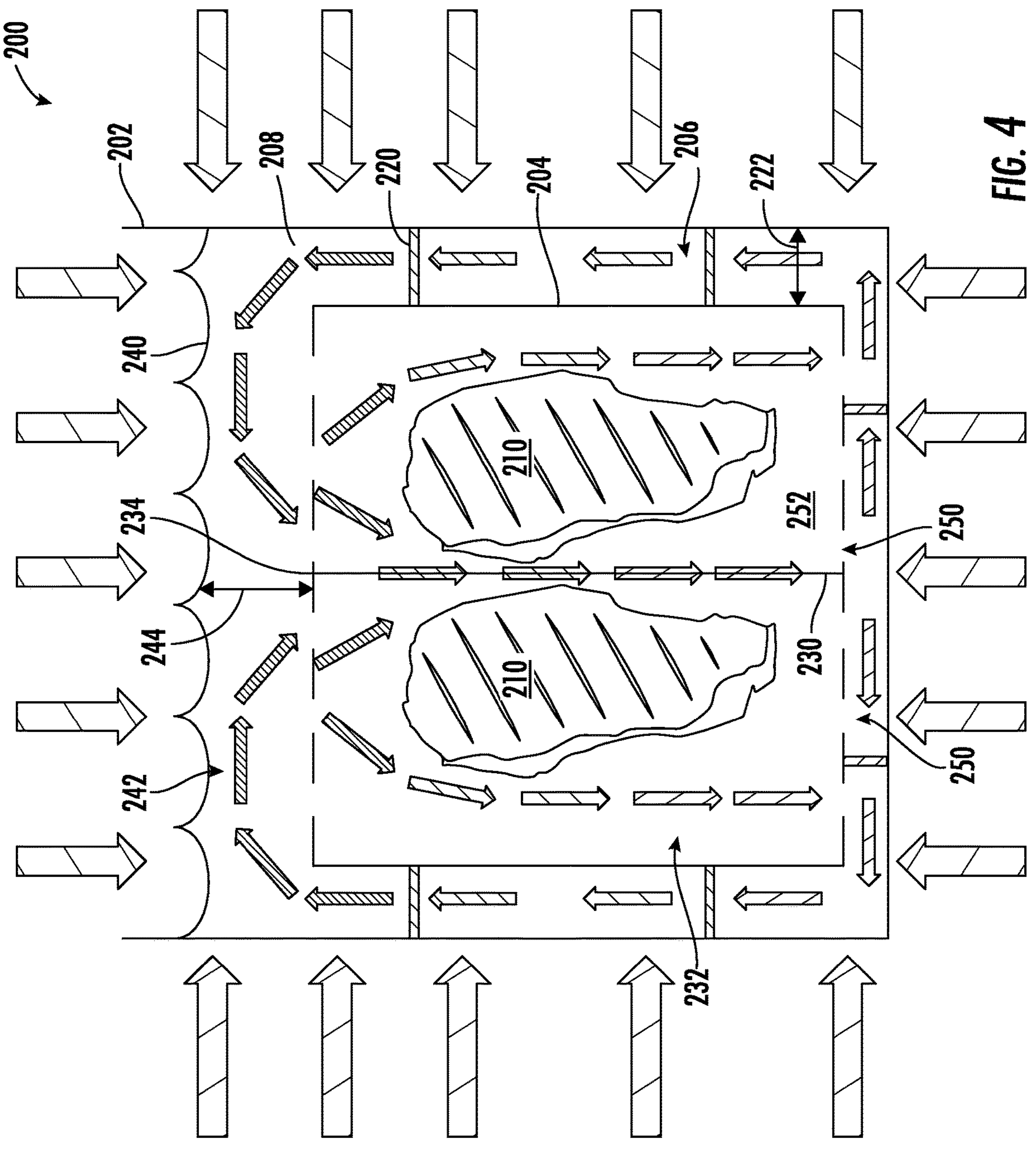
FIG. 4 provides a side, schematic view of the exemplary sous vide assembly of FIG. 3 according to an exemplary embodiment of the present subject matter.

Referring now specifically to FIGS. 3 and 4, sous vide assembly 200 will be described in detail according to an exemplary embodiment of the present subject matter. As mentioned above, sous vide assembly 200 is generally configured for receipt within cooking chamber 104 microwave oven 100 to facilitate a sous vide cooking process. However, it should be appreciated that the present subject matter is not limited to the specific construction of sous vide assembly 200 or to the particular application described, e.g., use within microwave oven 100.

Referring now to the figures, sous vide assembly 200 generally includes an outer tank 202 and an inner tank 204 positioned inside outer tank 202 such that a heating gap 206 is defined between inner tank 204 and outer tank 202. In general, outer tank 202 may be a watertight, open-top container having a bottom wall and a plurality of sidewalls that are joined and configured for containing a volume of liquid (e.g., illustrated herein as a water 208). As will be explained in more detail below, microwave heating assembly 130 is generally configured for heating water 208 to facilitate a sous vide cooking process and cook a food item (e.g., identified herein generally by reference numeral 210) positioned within inner tank 204.

According to the illustrated embodiment, outer tank 202 and inner tank 204 are joined together such that heating gap 206 is maintained throughout the sous vide cooking process. For example, according to the illustrated embodiment, sous vide assembly 200 may include a plurality of tank spacers 220 that are positioned between inner tank 204 and outer tank 202 to maintain heating gap 206. According to the illustrated embodiment, heating gap 206 is substantially constant around the sides and along the bottom of inner tank 204. However, it should be appreciated that heating gap 206 may vary according to alternative embodiments while remaining within the scope present subject matter. In this regard, for example, heating gap 206 may be larger where microwave energy is more intense, and vice versa.

In addition, tank spacers 220 and/or heating gap 206 may have any suitable size or dimension. For example, sous vide assembly 200 is generally sized and configured such that microwave energy penetrates the water 208 that is within heating gap 206 while the water 208 and food items 210 within inner tank 204 are not exposed to direct microwave energy. In this regard, as the microwave energy penetrates water 208, the electric field intensity decreases exponentially. When heating gap 206 is appropriately sized, substantially all of the microwave energy is absorbed within heating gap 206 (e.g., such that there is negligible cooking effect of the microwave energy on the food items 210). Accordingly, heating gap 206 may generally define a gap length 222 that is measured between outer tank 202 and inner tank 204. In this regard, gap length 222 may be measured perpendicular to outer tank 202 or as the shortest distance between a given point on outer tank 202 and the closest point on inner tank 204.

According to exemplary embodiments, gap length 222 may be between about 5 millimeters and 40 millimeters, between about 10 millimeters and 30 millimeters, or about 20 millimeters. It should be appreciated that gap length 222 may vary while remaining within the scope of the present subject matter. For example, the desirable gap length may vary based on the proximity of food items 210 to the outer tank, to the intensity of microwave energy, or based on any other suitable factors.

Notably, because microwave energy is intended only to penetrate into heating gap 206, the water 208 within the inner tank 204 is heated by heat transfer from water 208 within heating gap 206 into inner tank 204. Accordingly, inner tank 204 may be maintained at the desirable temperature by controlling the microwave energy that is imparted into heating gap 206 without exposing the water 208 within inner tank 204 to direct microwave energy. This provides for a more controlled sous vide cooking process within inner tank 204.

To avoid exposure of food items to direct microwave energy, food items 210 are intended to be contained entirely within inner tank 204. More specifically, according to the illustrated embodiment, sous vide assembly 200 further includes one or more vertical dividers 230 that are positioned within inner tank 204 and that extend substantially along the vertical direction V to define a plurality of food chambers 232. For example, according to the illustrated embodiment, sous vide assembly 200 includes one vertical divider 230 that defines two food chambers 232. It should be appreciated that more vertical dividers 230 may be used to define additional few chambers 232. As illustrated, a food item 210 (e.g., such as a steak) may be positioned within each of the food chamber 232 during the sous vide cooking process.

In general, vertical dividers 230 are illustrated herein as dividing inner tank 204 into two identically-sized compartments. However, it should be appreciated that according to alternative embodiments, any suitable number, size, configuration, and orientation of vertical dividers 230 may be used to form any suitable chamber configuration within inner tank 204. In general, food chambers 232 are sized such that one or more food items 210 may be positioned within each respective chamber 232 while providing sufficient space for water 208 to surround food items 210 and circulate within inner tank 204 for improved temperature uniformity throughout inner tank 204 and even cooking.

In addition, it may be desirable to ensure that food items 210 positioned within inner tank 204 remain submerged within water 208, e.g., to prevent direct exposure of food items 210 to microwave energy. Accordingly, sous vide assembly 200 may further include a cover 234 that is pivotally mounted over the one or more vertical dividers 230 and is movable between an open position and a closed position to provide selective access to the plurality of food chambers 232. For example, according to the exemplary illustrated embodiment, cover 234 is pivotally mounted to the ends of vertical dividers 230 and is movable to a closed position (e.g., as shown in FIG. 4) to define the top end of food chambers 232.

For reasons similar to those described above with respect heating gap 206 it is desirable that a top surface of water 208 is far enough above a top of food chambers 232 such that microwave energy does not directly enter food chambers 232 and cook food items 210. Accordingly, outer tank 202 may generally define a target fill line (e.g., identified generally by reference numeral 240) to which water 208 is filled prior to performing a sous vide cooking process. In addition, an upper heating gap 242 may generally be defined along the vertical direction V between a target fill line 240 and cover 234 when cover 234 is in the closed position. According to exemplary embodiments, upper heating gap 242 may define an upper gap length 244 that is substantially equivalent to or greater than gap length 222. In this manner, all six sides surrounding inner tank 204 and food chambers 232 may have sufficient depth to prevent microwave energy from being directly exposed to food items 210 being cooked during the sous vide process. In this regard, it may be desirable to ensure that cover 234 is fully submerged by the upper heating gap 242, e.g., to ensure that food items 210 are sufficiently submerged.

As best shown in FIG. 4, sous vide assembly 200 may further include one or more apertures 250 to provide fluid communication between outer tank 202 and inner tank 204. More specifically, inner tank 204 generally defines an internal reservoir 252 (e.g., including food chambers 232 and upper heating gap 242). The one or more apertures 250 provide fluid communication between internal reservoir 252 and heating gap 206. In general, apertures 250 may be defined throughout a perforated floor of inner tank 204 and may be used to ensure that the water levels within outer tank 202 and inner tank 204 remain at the same level (e.g., the target fill line 240). As illustrated, the sidewalls of inner tank 204 may be solid such that water may circulate from a top of inner tank 204, through apertures 250 in the perforate floor, and then back up through heating gap 206 before being recirculated. In general, this construction improves the water temperature variation within inner tank 204 such that the water temperature may be maintained with precision.

According to exemplary embodiments, vertical dividers 230 and cover 234 may be formed from any suitable materials and have any suitable construction that permits water 208 to flow freely around and within food chambers 232. For example, according to exemplary embodiments, vertical dividers 230 and cover 234 are formed from perforated plates, mesh sheets, lattice structures, interwoven wires, or any other suitable material and construction. In this manner, water 208 within inner tank 204 may circulate freely between and among food chambers 232 such that there are minimal temperature gradients throughout food chambers 232 and inner tank 204.

According to exemplary embodiments, inner tank 204, outer tank 202, vertical dividers 230, and cover 234 may be formed in any suitable manner and using any suitable material. For example, all of these components may be injection molded with a food-grade polymer material. Accordingly, it should be appreciated that various features of sous vide assembly 200 may be formed from any suitably rigid material. For example, according to exemplary embodiments, inner tank 204, outer tank 202, vertical dividers 230, and cover 234 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of sous vide assembly 200 may be formed from any other suitable rigid material.

Now that the construction of microwave oven appliance 100 and the configuration of controller 150 according to exemplary embodiments have been presented, an exemplary method 300 of operating a microwave oven appliance and sous vide assembly will be described. Although the discussion below refers to the exemplary method 300 of operating microwave oven appliance 100, one skilled in the art will appreciate that the exemplary method 300 is applicable to the operation of a variety of other microwave appliances and sous vide assemblies. In exemplary embodiments, the various method steps as disclosed herein may be performed by controller 150 or a separate, dedicated controller.

Figure 5:
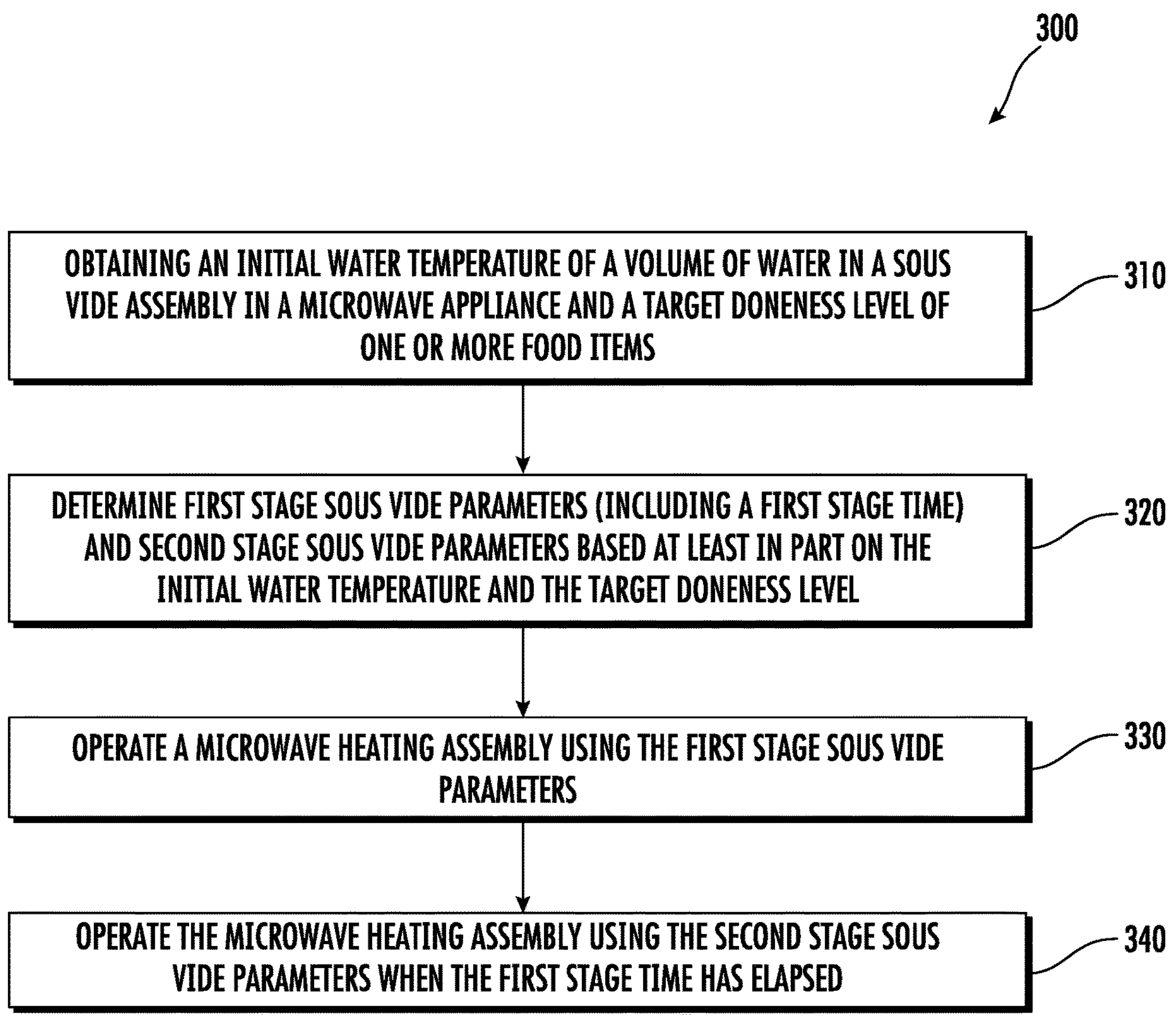
FIG. 5 provides a method of operating a microwave appliance including a sous vide assembly according to an example embodiment of the present subject matter.

Referring now to FIG. 5, method 300 includes, at step 310, obtaining an initial water temperature of a volume of water in a sous vide assembly in a microwave appliance and a target doneness level of one or more food items being cooked in the sous vide assembly. For example, continuing the example from above, controller 150 of microwave appliance 100 may be provided with or may obtain this data regarding a sous vide operation being performed within sous vide assembly 200. Although exemplary means for inputting/receiving these values are described below, it should be appreciated that controller 150 may obtain this data in any other suitable manner.

As used herein, the "initial water temperature" may be used to generally refer to the average temperature of the volume of liquid (e.g., water) contained within outer tank 202 of sous vide assembly 200 just prior to the commencement of a sous vide cycle using sous vide assembly 200 within microwave appliance 100. For example, this initial water temperature may be obtained after the food products being cooked (e.g., steaks) have been added to inner tank 204 and after outer tank 202 is filled with water up to target fill line 240. Notably, this measurement may be useful to account for variations in the initial thermal characteristics of the sous vide assembly. For example, if cold steaks and cold tap water are used, the sous vide cycle parameters should be adjusted to impart more energy than if the cycle starts with room temperature steaks and warm water.

According to example embodiments, this initial water temperature may be input by a user based on a manual temperature measurement, e.g., using a temperature probe prior to inserting sous vide assembly 200. For example, sous vide assembly 200 or microwave assembly 100 may include a temperature sensor (e.g., thermometer, thermocouple, thermistor, or other suitable probe) that may be inserted into the water to obtain the initial water temperature. This initial water temperature may be automatically read by controller 150 or may be manually input by the user through the user interface panel 140. According to still other example embodiments, the initial water temperature may be input using a remote device (e.g., such as via a smartphone software application on a user's cell phone).

As used herein, the "target doneness level" may be used generally to refer to the target internal temperature of the food products at the end of the sous vide cooking process. For example, if a user desires steaks cooked to medium, the target doneness level may be "Medium" or a corresponding temperature, e.g., between 135° and 145°. By contrast, if a user desires steaks cooked to medium-well, the target doneness level may be "Medium-Well" or a corresponding temperature, e.g., between 145° and 155°. Notably, this target doneness level may be useful to establish the amount of thermal energy needed to get the steaks from the initial state to the finished state. For example, if the user desires well-done steaks, the sous vide cycle parameters should be adjusted to impart more energy than if the user desires rare steaks.

Notably, the alternating current (AC) line voltage that is supplied to the microwave appliance 100 may have an effect on the microwave energy generated by microwave heating assembly 130. For example, during Stage 1, when the magnetron is operating at 100% capacity, a variation in input voltage to the appliance may affect the actual microwave energy generated by the magnetron. Accordingly, the Stage 1 time may be dependent upon the AC line voltage (e.g., as explained below). Notably, controller 150 of microwave appliance 100 may include features for automatically detecting the AC line voltage as it enters the appliance.

Step 320 may include determining the first stage sous vide parameters and second stage sous vide parameters based at least in part on the initial water temperature and the target doneness level. In this regard, aspects of the present subject matter are generally directed to means for facilitating a sous vide process efficiently by getting the water temperature up to the target temperature as quickly as possible without overcooking the food product. Accordingly, this may be achieved by performing a first stage (i.e., Stage 1) where the magnetron is operated at maximum capacity to heat up the volume of water without overheating the top of the food. For example, Stage 1 may rely on the thermal gradients within heating gap 206 to ensure the water in inner tank 204 does not reach undesirable temperatures. By contrast, Stage 2 may include reducing the power level to raise the average water temperature within inner tank 204 to the target finish temperature of the food products and maintain that temperature for the remainder of the cook cycle.

According to example embodiments, determining the first stage sous vide parameters may include determining a high power level and the first stage time associated with the first stage of the sous vide cooking process. For example, according to example embodiments, the high power level is the maximum power level of microwave oven appliance 100 (e.g., operating magnetron at 100% power). As explained above, this power level is selected to achieve the fastest heating of water within sous vide assembly 200.

Notably, it is also desirable to stop or decrease operation of the magnetron before the heated water propagates into inner tank 204 without overheating the top of the food. Accordingly, aspects of the present subject matter may include determining a time at which Stage 1 should end and Stage 2 (e.g., the lower power stage) should commence. One exemplary method of determining such a time as shown below with respect to Equation 1. According to example embodiments, step 320 and the determination of Stage 1 and Stage 2 parameters may occur at the commencement of the sous vide cycle based on the initial and target cooking parameters.

According to an example embodiment, the cooking time for Stage 1 may be determined as shown below with reference to Equation 1. In this regard, A, B, and C may be fixed coefficients determined empirically or in any other manner. The variable $temp_{H2O-i}$ may refer generally to the initial water temperature as described above, the variable $temp_{target}$ may refer generally to the target doneness, and the variable $V_{AC}$ may be an AC line voltage input to the microwave appliance 100. Although exemplary parameters are shown in the regression equation below, it should be appreciated that aspects of the present subject matter may further include other variables, such as the initial temperature of the food products (e.g., raw steak temperatures), water surface temperatures, etc.

$$\text{Stage 1 Time} = A \cdot \frac{temp_{H2O-i}}{V_{AC}} + B \cdot \frac{temp_{target}}{V_{AC}} + C \quad \text{Equation 1}$$

Determining the second stage sous vide parameters may include determining a reduced power level and a second stage time associated with the second stage sous vide parameters. In general, the second stage time may be fixed by the appliance or set by the user, e.g., based on the desired finish time of a cooking process. For example, if a user starts their steaks at 5:00 pm and wishes to have them done at 6:30 pm, the second stage time would be 90 minutes minus the stage one time (e.g., as determined above in Equation 1).

Figures 6, 7:
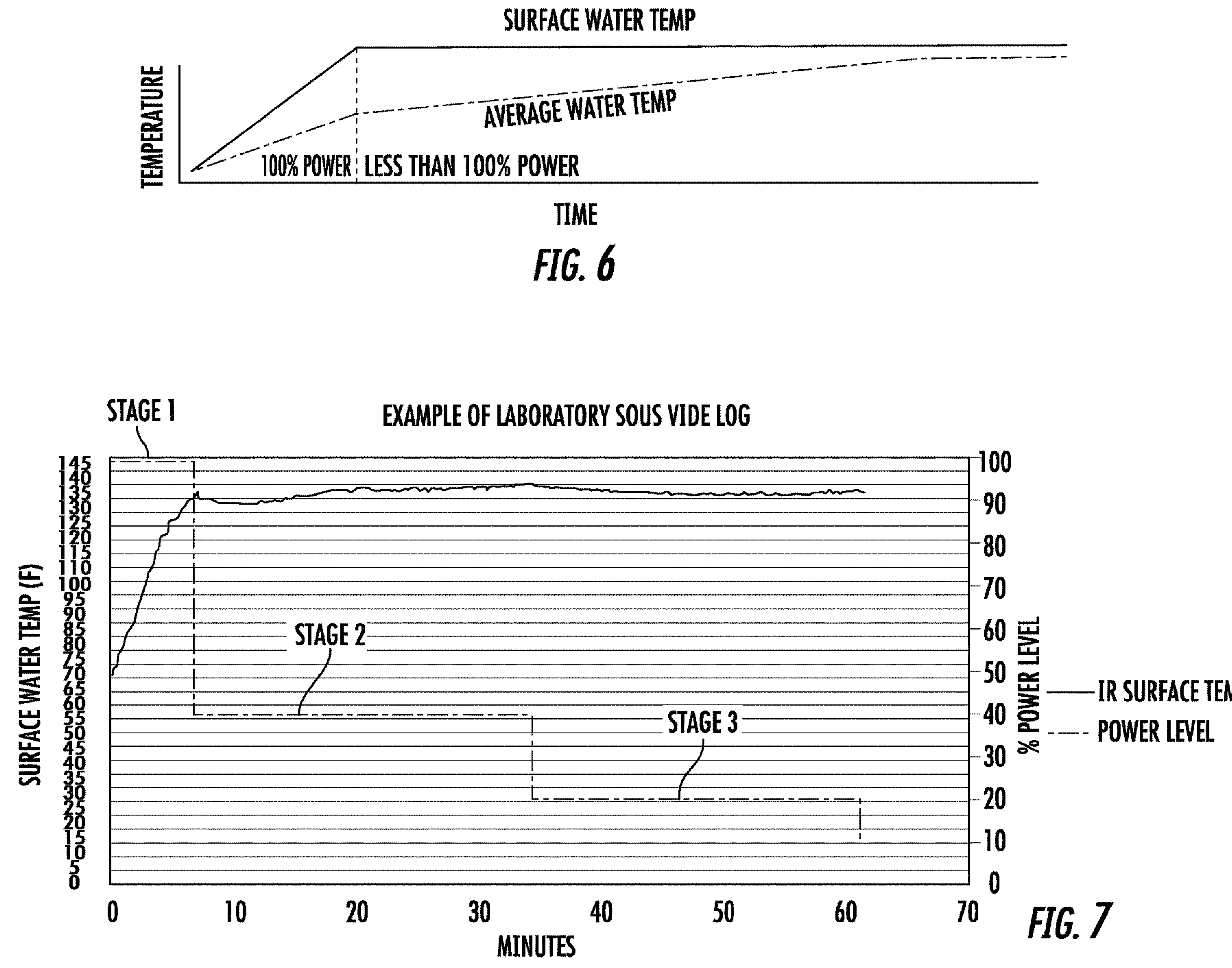
FIG. 6 is a plot showing a relationship between a surface temperature and an average water temperature in a sous vide assembly according to an example embodiment of the present subject matter.
FIG. 7 is a plot showing a surface temperature of water in a sous vide assembly as a microwave operates at varying power stages according to an example embodiment of the present subject matter.

In general, the reduced power level may be selected to maintain the surface temperature while an average water temperature increases. For example, referring now briefly to FIG. 6, a plot showing a relationship between a surface temperature and an average water temperature in a sous vide assembly is provided according to an example embodiment. As shown, the heat introduced onto the surface of the water within the sous vide assembly takes some time to propagate throughout the container and raise the average temperature therein. In this manner, the food products are protected from the surface temperature and there is a reduced likelihood of overcooking the food.

This reduced power level may be established based on the total energy needed to cook the food product and the amount of time remaining to provide that energy. In general, Equation 2 provides an example relationship between the total energy ($E_{Total}$), the AC line voltage ($V_{AC}$), the Stage 1 time, and the Stage 2 time. In this equation, D, E, and F may be fixed coefficients determined empirically or in any other manner. Notably, by knowing the amount of energy input during Stage I, the total amount of energy needed, and the time remaining for providing that energy, the reduced power level may be determined. Although exemplary parameters are shown in the regression equation below, it should be appreciated that aspects of the present subject matter may further include other variables, such as the initial temperature of the food products (e.g., raw steak temperatures), water surface temperatures, etc.

$$E_{Total} = D \cdot V_{AC} + E \cdot \text{Stage 2 Time} + F \cdot \text{Stage 1 Time} \quad \text{Equation 2}$$

In general, Equations 1 and 2 are provided above as an example of one methodology for determining the proper energy inputs and stage durations for an exemplary sous vide process. However, it should be appreciated that these equations may be modified while remaining within the scope of the present subject matter. For example, other variables may be used, the coefficient values may be modified based on empirical data or studies, etc. In addition, it should be appreciated that these relationships may be embodied in any other suitable form, such as other predetermined regression equations, a predetermined lookup table, or a predetermined mathematical relationship. These relationships may be used to determine the quantity of microwave energy and associated magnetron levels and cooking times for each stage at the commencement of the cooking process.

Step 330 generally includes operating a microwave heating assembly using the first stage sous vide parameters. In this regard, continuing the example from above, magnetron may be turned on the high power level and may be operated for the Stage 1 time. Based on the known power output from magnetron and the duration of that output, the energy input from Stage 1 may be determined. In general, the energy input during the stage may be approximately 30 to 50% of the total energy.

Step 340 may generally include operating a microwave heating assembly using the second stage sous vide parameters after the Stage 1 time has elapsed to complete the sous vide process. In this regard, after the Stage 1 time has elapsed, the operation of magnetron may be adjusted such that it operates at the reduced power level. This power level may be maintained until the Stage 2 time has elapsed, at which point the average water temperature within sous vide assembly 200 has reached the temperatures associated with the target doneness level. At this point, the cooking process may end and the food may be consumed. Alternatively, as described in more detail below, the sous vide process may have additional stages that may be used to maintain the water temperature and the meat temperature for a predetermined amount of time.

Notably, because step 320 results in a determination of first stage sous vide parameters and second stage sous vide parameters which include the Stage I and 2 times, the total remaining time may be estimated by controller (e.g., as the sum of Stage 1 time and Stage 2 time). Accordingly, controller 150 may be further configured for displaying the remaining time for user convenience, e.g., on the appliance user interface panel 140. According to still other embodiments, the remaining time may be displayed on a remote device associated with the user (e.g., such as a mobile phone connected to the appliance through a remote network).

Although step 320 as described above as determining first and second stage sous vide parameters. It should be appreciated that according to alternative embodiments, method 300 may include additional stages of the cooking process. For example, step 320 may further include determining third stage sous vide parameters based at least in part on the initial water temperature and the target doneness level. For example, the third stage sous vide parameters may include a minimal power level and a third stage time. According to such an embodiment, the total cooking time may be the sum of the first, second, and third stages, but the total energy imparted may remain the same. Accordingly, in an embodiment using three stages (see, e.g., FIG. 7), the sum of the Stage 2 and 3 energies may be equivalent to the Stage 2 energy as described above. Notably, however, the minimal power level may be less than the reduced power level and may be selected such that it maintains the average water temperature without facilitating any further increase in water temperature. For example, referring now briefly to FIG. 7, an exemplary relationship between the surface temperature of the water within a sous vide vessel over time and through multiple stages is provided.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using microwave oven appliance 100 and sous vide assembly 200 as an example, it should be appreciated that this method may be applied to the operation of any suitable microwave appliance and sous vide assembly.

As explained herein, aspects of the present subject matter are generally directed to a sous vide cooking fixture assembly for a microwave oven that may include. The sous vide fixture may include two tanks—an outer and an inner tank—with food dividers and a lid to prevent food from floating up to the surface of the water. The outer tank may be filled with water, absorbs microwave energy on all six sides, and conducts heat to the inner tank. The inner tank may only absorb energy on top surface of water, thereby improving water temperature variation so that steaks or other food items can be cooked uniformly.

In addition, or alternatively, aspects of the present subject matter are directed to a microwave oven utilizing a sous vide cooking technique. Generally, conventional counter-top sous vide cooking appliances use a separate immersion pump dipped into a sous vide reservoir that stirs and maintains water in the sous vide reservoir at a uniform temperature throughout the cooking process. Also, in a conventional microwave oven cooking process, heat/temperature may not thoroughly cook into a food, as the water in the food does not heat from direct microwave energy absorption. In order to overcome the aforementioned problems, aspects of the present subject matter integrate the microwave oven with the sous vide cooking technique and thereby eliminates the usage of separate counter-top sous vide appliances.

According to exemplary embodiments, a consumer selects the quantity of servings, the type of food, and the desired doneness from a selection menu. Then, the consumer may place the food in a vacuum-sealed bag or container and into the sous vide reservoir. The consumer may also use hot water in the sous vide reservoir to save time in heating water and may be prompted if the water is too hot from a tap for the food doneness selection, so that the consumer may then refill with cooler water.

For example, when a magnetron in the microwave oven is on, microwave field patterns randomize the patterns continuously across the surface of the water. This randomized energy absorption, combined with warm water convectively rising, causes variation across the surface of the water. By turning the magnetron off, and waiting a short time period, the temperature variation across the surface decreases, enabling a more accurate temperature measurement. Thereafter, power control software may optimize the power level to the minimum, and the sous vide reservoir may be maintained at a uniform temperature.

As explained herein, aspects of the present subject matter are generally directed to an over-the-air sous vide feature for a microwave appliance. For example, a consumer may download over-the-air (OTA) software on a remote device for facilitating operation of the microwave appliance with a sous vide kit designed for use in the microwave. For example, the sous vide kit may include the sous vide container, a digital thermometer, recipes, instructions, etc.

During operation, the consumer may load food items into the container and fill it with tap water. The consumer may then measure the initial temperature of the water and place the container in the oven cavity. In the case of steaks, the OTA software may prompt the user for: initial water temperature, food quantity, and choice of Medium or Well Done (or some other cooking temperature). A countdown timer may be displayed to inform the consumer of the time remaining after the start of cooking. According to example embodiments, the consumer does not set a water temperature.

In general, the sous vide container prevents the food from absorbing direct microwave energy. Instead, the water is heated with microwave energy, and the hot water conducts energy into the food. According to example embodiments, there is no sensor to measure the internal temperature of the water during cooking. A control algorithm may use initial conditions and equations derived from laboratory data. The amount of microwave energy applied to the sous vide container may vary during the cooking session to keep the water temperature in the desirable cooking range. This feature can be used for cooking foods other than steaks as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A microwave oven appliance defining a vertical, a lateral, and a transverse direction, the microwave oven appliance comprising:

- a cabinet defining a cooking chamber;
- a door rotatably mounted to the cabinet for providing selective access to the cooking chamber;
- a microwave heating assembly for generating microwave energy within the cooking chamber;
- a sous vide assembly configured for receipt within the cooking chamber for cooking one or more food items, the sous vide assembly comprising an outer tank configured for containing a volume of water; and
- a controller in operative communication with the microwave heating assembly, the controller being configured to:
  - obtain an initial water temperature of the volume of water and a target doneness level of the one or more food items;
  - determine first stage sous vide parameters and second stage sous vide parameters based at least in part on the initial water temperature and the target doneness level, the first stage sous vide parameters comprising a first stage time;
  - operate the microwave heating assembly using the first stage sous vide parameters; and
  - operate the microwave heating assembly using the second stage sous vide parameters when the first stage time has elapsed.

2. The microwave oven appliance of claim 1, wherein the initial water temperature and the target doneness level are input by a user of the microwave oven appliance.

3. The microwave oven appliance of claim 1, wherein determining the first stage sous vide parameters and the second stage sous vide parameters comprises:

determining a high power level and the first stage time associated with the first stage sous vide parameters; and determining a reduced power level and a second stage time associated with the second stage sous vide parameters.

4. The microwave oven appliance of claim 3, wherein the high power level is a maximum power level of the microwave oven appliance.

5. The microwave oven appliance of claim 3, wherein the reduced power level is selected to maintain the surface temperature steady while an average water temperature increases.

6. The microwave oven appliance of claim 1, wherein the first stage sous vide parameters and the second stage sous vide parameters are determined based at least in part on an alternating current (AC) line voltage supplied to the microwave oven appliance.

7. The microwave oven appliance of claim 1, wherein the controller is further configured to:

determine third stage sous vide parameters based at least in part on the initial water temperature and the target doneness level, wherein the third stage sous vide parameters comprise a minimal power level and a third stage time; and operate the microwave heating assembly using the third stage sous vide parameters.

8. The microwave oven appliance of claim 7, wherein the minimal power level is selected to maintain an average water temperature.

9. The microwave oven appliance of claim 1, wherein determining first stage sous vide parameters and second stage sous vide parameters based at least in part on the initial water temperature and the target doneness level comprises:

using a predetermined regression equation, a predetermined lookup table, or a predetermined mathematical relationship.

10. The microwave oven appliance of claim 9, wherein the predetermined regression equation, the predetermined lookup table, or the predetermined mathematical relationship determines a quantity of microwave energy and associated magnetron levels and cooking times for each stage at commencement of a cooking process.

11. The microwave oven appliance of claim 1, wherein the controller is further configured to:

determine a remaining cooking time based at least in part on the initial water temperature and the target doneness level; and display the remaining cook time.

12. The microwave oven appliance of claim 1, wherein the sous vide assembly comprises:

an inner tank positioned inside the outer tank such that a heating gap is defined between the inner tank and the outer tank, wherein the inner tank defines an internal reservoir and at least one aperture to provide fluid communication between the internal reservoir and the heating gap defined between the inner tank and the outer tank;

one or more vertical dividers positioned within the inner tank and extending along the vertical direction to define a plurality of food chambers; and a cover mounted over the one or more vertical dividers and being movable between an open position and a closed position to provide selective access to the plurality of food chambers.

13. The microwave oven appliance of claim 1, wherein the microwave heating assembly comprises:

a magnetron; and a power supply operably coupled to the magnetron to generate the microwave energy within the cooking chamber.

* * * * *